US012753650B2

(12) United States Patent
Ohba et al.

(10) Patent No.: US 12,753,650 B2
(45) Date of Patent: *Oct. 6, 2026

(54) AUTOMATIC DOOR SYSTEM

(71) Applicant: OPTEX CO., LTD., Shiga (JP)

(72) Inventors: Hiroyuki Ohba, Shiga (JP); Hiroaki Tanabe, Shiga (JP); Takayasu Ikeda, Shiga (JP)

(73) Assignee: OPTEX CO., LTD., Shiga (JP)

( * ) Notice: Subject to any disclaimer, the term of this patent is extended or adjusted under 35 U.S.C. 154(b) by 289 days.

This patent is subject to a terminal disclaimer.

(21) Appl. No.: 18/574,275

(22) PCT Filed: Dec. 13, 2022

(86) PCT No.: PCT/JP2022/045804

§ 371 (c)(1),
(2) Date: Dec. 26, 2023

(87) PCT Pub. No.: WO2023/149092

PCT Pub. Date: Aug. 10, 2023

(65) Prior Publication Data

US 2024/0287846 A1 Aug. 29, 2024

(30) Foreign Application Priority Data

Feb. 2, 2022 (JP) ................................ 2022-015077

(51) Int. Cl.
*E05F 15/73* (2015.01)

(52) U.S. Cl.
CPC ......... *E05F 15/73* (2015.01); *E05Y 2900/132* (2013.01)

(58) Field of Classification Search
CPC ........................... E05F 15/73; E05Y 2900/132
See application file for complete search history.

(56) References Cited

U.S. PATENT DOCUMENTS

2007/0094932 A1* 5/2007 Hoshide .................. E05F 15/73 49/118
2016/0259047 A1* 9/2016 Blech .................... G01S 13/887
(Continued)

FOREIGN PATENT DOCUMENTS

JP 2003-193745 A 7/2003
JP 2006-225874 A 8/2006
(Continued)

OTHER PUBLICATIONS

International Search Report issued in PCT/JP2022/045804; mailed Feb. 7, 2023.
(Continued)

*Primary Examiner* — Bernarr E Gregory
*Assistant Examiner* — Isabella A Edrada
(74) *Attorney, Agent, or Firm* — Studebaker Brackett PLLC

(57) ABSTRACT

An automatic door system includes a double sliding door. The automatic door system includes: one sensor configured to detect a target; and a door opening and closing control unit configured to control opening and closing of the door based on a detection result of the sensor. The sensor includes one or more transmitting elements configured to transmit a frequency modulated continuous wave (FMCW) type transmitted electromagnetic wave, and two or more receiving elements configured to receive a reflected electromagnetic wave obtained by the transmitted electromagnetic wave being reflected by the target. A detection region of the sensor includes, in addition to a region through which the target passes for passing through the door, a region in a vicinity of two door pockets of the door.

5 Claims, 16 Drawing Sheets

(56) References Cited

U.S. PATENT DOCUMENTS

| | | | | |
|---|---|---|---|---|
| 2023/0134584 A1* | 5/2023 | Burhenn | ................. | E05F 15/73 49/28 |
| 2023/0193685 A1* | 6/2023 | Hauri | ...................... | E05F 15/73 49/31 |
| 2024/0302515 A1* | 9/2024 | Ohba | ...................... | E05F 15/73 |

FOREIGN PATENT DOCUMENTS

| | | | |
|---|---|---|---|
| JP | 2008-291598 | A | 12/2008 |
| JP | 2011-112600 | A | 6/2011 |
| JP | 2012-127152 | A | 7/2012 |
| JP | 2019-178590 | A | 10/2019 |
| JP | 2021-050550 | A | 4/2021 |
| JP | 2021-161775 | A | 10/2021 |
| WO | 2005-028795 | A1 | 3/2005 |
| WO | 2018-043511 | A1 | 3/2018 |
| WO | 2018/192877 | A1 | 10/2018 |

OTHER PUBLICATIONS

Extended European Search Report issued in EP 22924996.6-1005 by the European Patent Office on Jan. 2, 2026.

* cited by examiner

AUTOMATIC DOOR SYSTEM

TECHNICAL FIELD

The present invention relates to an automatic door system that controls an opening and closing operation of a door based on a detection result obtained by a sensor.

BACKGROUND ART

An automatic door system that controls an opening and closing operation of a door based on a detection result of a target obtained by a sensor is widely used. For example, Patent Literature 1 discloses an automatic door control system that detects a target using two sensors.

CITATION LIST

Patent Literature

Patent Literature 1: WO2018/192877

SUMMARY OF INVENTION

Technical Problem

In Patent Literature 1, two sensors are provided in order to detect a target present in a region in the vicinity of door pockets of two sliding doors, which may increase the cost and complicate the control of opening and closing the sliding door.

An aspect of the present invention is to provide an automatic door system capable of detecting a target present in a region including a region in the vicinity of two door pockets with one sensor.

Solution to Problem

In order to solve the above problems, an automatic door system according to an aspect of the present disclosure is an automatic door system including a double sliding door. The automatic door system includes: one sensor configured to detect a target; and a door opening and closing control unit configured to control opening and closing of the door based on a detection result of the sensor. The sensor includes one or more transmitting elements configured to transmit a frequency modulated continuous wave (FMCW) type transmitted electromagnetic wave, and two or more receiving elements configured to receive a reflected electromagnetic wave obtained by the transmitted electromagnetic wave being reflected by the target. A detection region of the sensor includes, in addition to a region through which the target passes for passing through the door, a region in a vicinity of two door pockets of the door.

Advantageous Effects of Invention

According to an aspect of the present disclosure, it is possible to detect a target present in a region including a region in the vicinity of two door pockets with one sensor.

DESCRIPTION OF EMBODIMENTS

Embodiment 1

Figure 1:
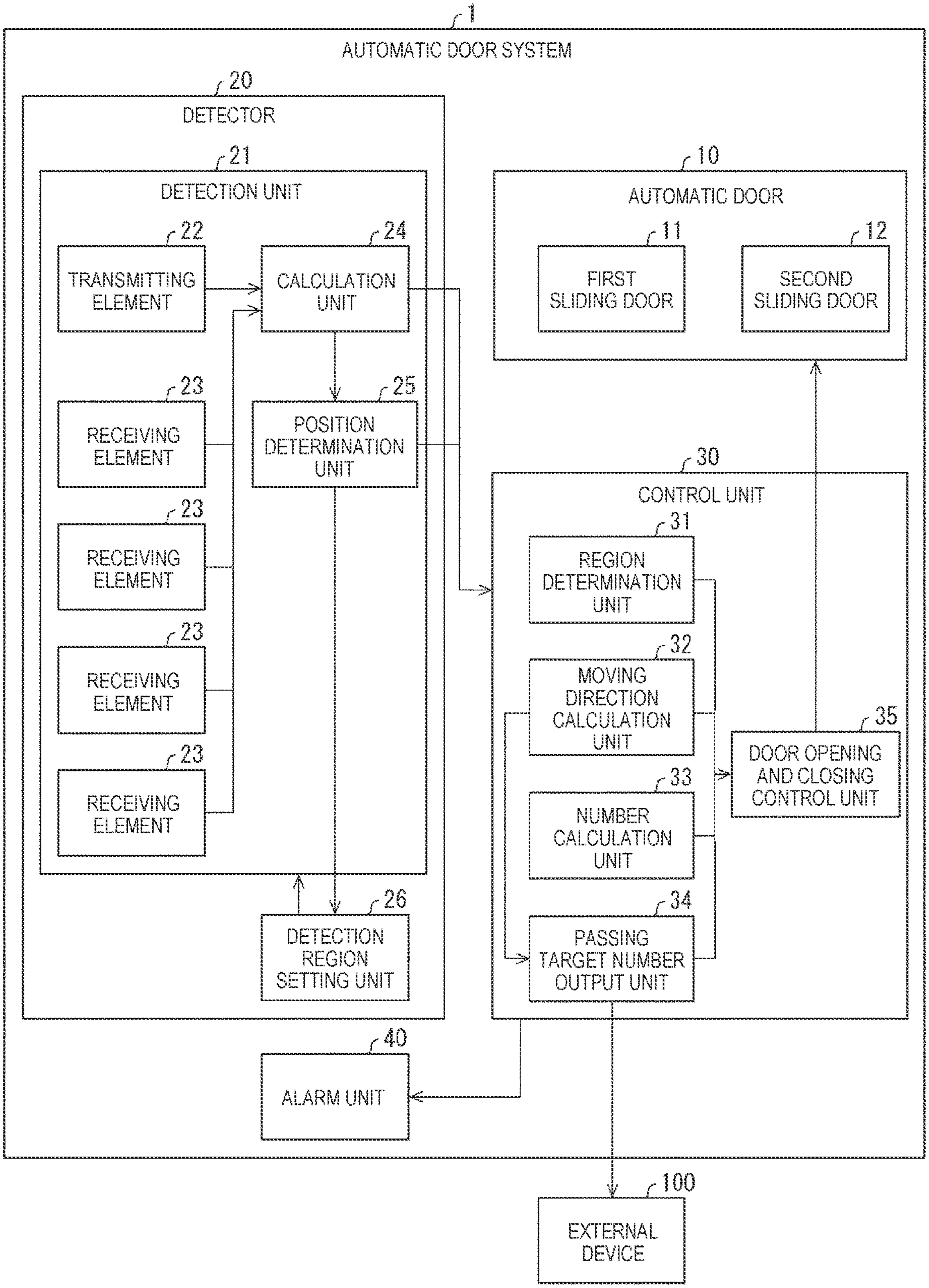
FIG. 1 is a block diagram showing a main configuration of an automatic door system according to an embodiment 1 of the present disclosure.
Figure 2:
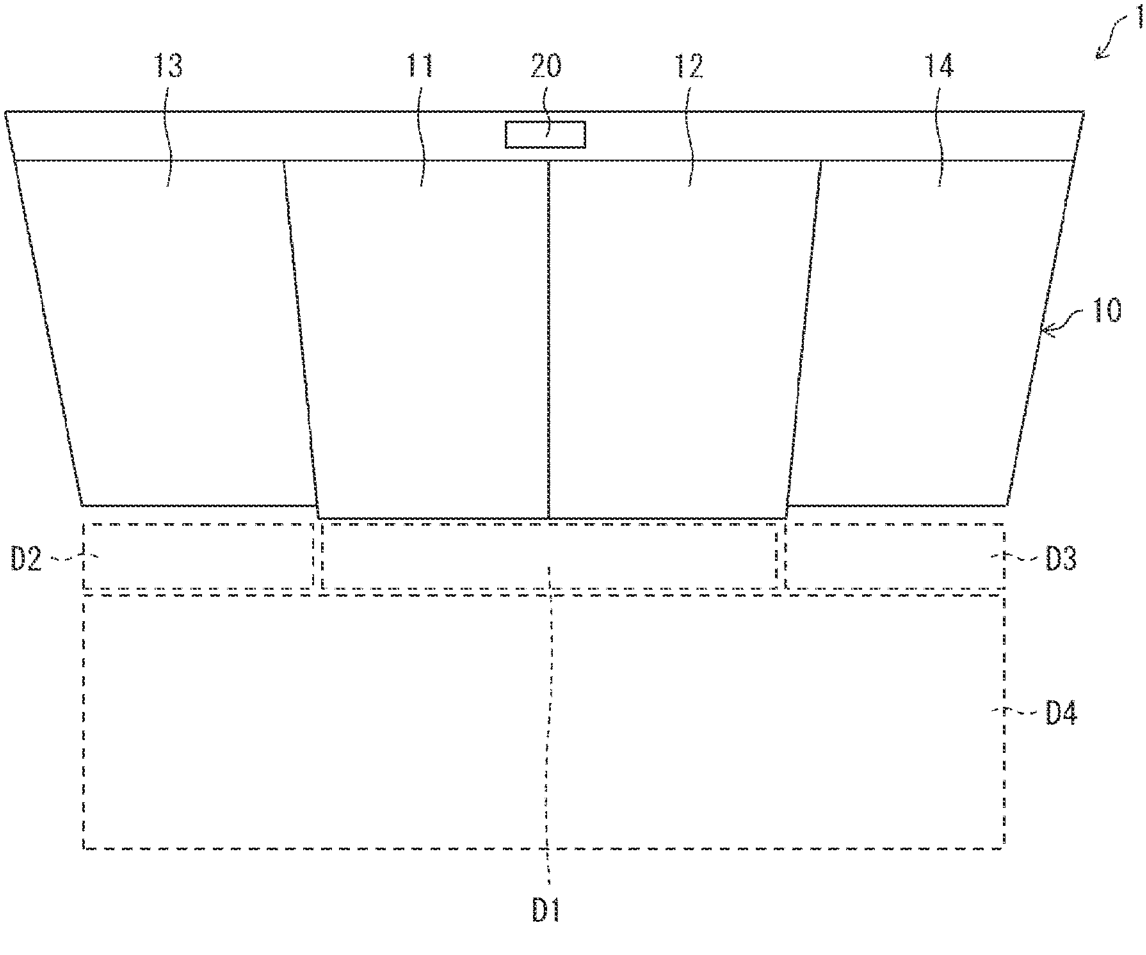
FIG. 2 is an external view of the automatic door system described above.

Hereinafter, an embodiment of the present disclosure will be described in detail. FIG. 1 is a block diagram showing a main configuration of an automatic door system 1 (a door system) according to the present embodiment. FIG. 2 is an external view of the automatic door system 1. FIG. 2 is a view of the automatic door 10 as viewed from the outside, and is a view showing a state in which the first sliding door 11 and the second sliding door 12 to be described later are in a closed state.

As shown in FIGS. 1 and 2, the automatic door system 1 includes an automatic door 10, a detector 20 (a sensor), a control unit 30, and an alarm unit 40.

The automatic door 10 includes the first sliding door 11 (a door) and the second sliding door 12 (a door) as a double sliding door, a first door pocket 13 in which the first sliding door 11 is located when the first sliding door 11 is in an open state, and a second door pocket 14 in which the second sliding door 12 is located when the second sliding door 12 is in an open state.

The detector 20 includes a detection unit 21 and a detection region setting unit 26. The detection unit 21 includes one or more transmitting elements 22, two or more receiving elements 23, a calculation unit 24, and a position determination unit 25. The detector 20 is provided at an upper portion of the automatic door 10.

The transmitting element 22 transmits a frequency modulated continuous wave (FMCW) type transmitted electromagnetic wave. Specifically, the transmitting element 22 transmits a transmitted electromagnetic wave called a chirp, which is modulated such that the frequency linearly changes with the passage of time.

The receiving element 23 receives a reflected electromagnetic wave obtained by a transmitted electromagnetic wave transmitted from the transmitting element 22 being reflected by a person or an object. Hereinafter, a person or an object to be detected by the detector 20 is referred to as a "target". The receiving elements 23 are often arranged at intervals of $\lambda/2$ when the wavelength of the transmitted electromagnetic wave is $\lambda$.

Here, it is known that the number N of the receiving elements 23 and the theoretical angular resolution $\theta$ (rad) are approximated to a relationship expressed by the following equation (1).

$$\theta=2/N \quad (1)$$

As can be seen from the equation (1), the resolution improves as the number N of the receiving elements 23 increases. Therefore, it is preferable that the number of the receiving elements 23 is 4 or more.

As described above, since the receiving elements 23 are often arranged at intervals of $\lambda/2$, the smaller the wavelength of the transmitted electromagnetic wave, in other words, the higher the frequency, the smaller the size of the detector 20 can be. Therefore, the frequency of the transmitted electromagnetic wave is preferably 55 GHz or more.

Since the detector 20 includes the transmitting element 22 and the receiving element 23 described above, the range is large in which a target can be detected. As shown in FIG. 2, the detector 20 can set a region including a region D1, a region D2, a region D3, and a region D4 as a detectable region. The detector 20 senses the entire detection region.

A range of the region D1 in a sliding direction of the first sliding door 11 and the second sliding door 12 is a range where the first sliding door 11 and the second sliding door 12 are located when the first sliding door 11 and the second sliding door 12 are in a closed state. A range of the region in a direction perpendicular to the sliding direction is a range from the automatic door 10 to a predetermined distance. The region D1 is a region through which a target passes for passing through the automatic door 10. Hereinafter, a direction (that is, a left-right direction in FIG. 2) in which the first sliding door 11 and the second sliding door slide is referred to as a sliding direction, and a direction (that is, an upper-lower direction in FIG. 2) perpendicular to the sliding direction is referred to as a depth direction.

The region D2 is a region in the vicinity of the first door pocket 13, a range of the region D2 in the sliding direction is a range where the first door pocket 13 is located, and a range of the region D2 in the depth direction is a range from the automatic door 10 to the predetermined distance described above. The region D3 is a region in the vicinity of the second door pocket 14, a range of the region D3 in the sliding direction is a range where the second door pocket 14 is located, and a range of the region D3 in the depth direction is a range from the automatic door 10 to the predetermined distance described above. A range of the region D4 in the sliding direction is a range from an outer end portion of the first door pocket 13 to an outer end portion of the second door pocket 14, and a range of the region D4 in the depth direction is a range outside the regions D1 to D3 by a predetermined distance. The regions D1 to D4 also have a predetermined range in a height direction. The ranges of the regions D1 to D4 in the sliding direction and the ranges of the regions D1 to D4 in the depth direction are adjusted according to a site where the automatic door 10 is provided.

The calculation unit 24 calculates, using a transmitted electromagnetic wave transmitted from the transmitting element 22 and a reflected electromagnetic wave received by the receiving element 23, the distance from the detector 20 to a target, the moving speed of the target, and the angle (in other words, the angle of the target with respect to the detector 20) of arrival of the reflected electromagnetic wave.

Specifically, the calculation unit 24 mixes a signal indicating a transmitted electromagnetic wave and a signal indicating a reflected electromagnetic wave at a predetermined time interval to generate an intermediate frequency signal. The calculation unit 24 generates intermediate frequency signals each corresponding to a respective one of the plurality of receiving elements 23.

The calculation unit 24 calculates the distance from the detector 20 to a target based on a phase difference between a transmitted electromagnetic wave and a reflected electromagnetic wave that appears in the generated intermediate frequency signal. The calculation unit 24 calculates the moving speed of a target based on the phase difference in the intermediate frequency signal generated at the predetermined time interval described above. The calculation unit 24 calculates the angle of arrival of the reflected electromagnetic wave based on the phase difference in a plurality of intermediate frequency signals generated corresponding to the plurality of receiving elements 23.

The calculation unit 24 outputs, to the position determination unit 25 and the control unit 30, the calculated distance from the detector 20 to a target, moving speed of the target, and angle of arrival of a reflected electromagnetic wave.

The position determination unit 25 determines the position of the target using the distance from the detector 20 to the target and the angle of arrival of the reflected electromagnetic wave, which are calculated by the calculation unit 24.

The detection region setting unit 26 sets, as a detection region, a predetermined region including the position of the target calculated by the position determination unit 25 among the regions D1 to D4 which are detectable ranges in which the target can be detected. The detection region setting unit 26 outputs the set detection region to the detection unit 21. The detection unit 21 executes detection in the detection region set by the detection region setting unit 26.

In an aspect of the present disclosure, when a plurality of targets are present in the detectable region, the detection region setting unit 26 can set a plurality of regions as the detection region.

Figure 3:
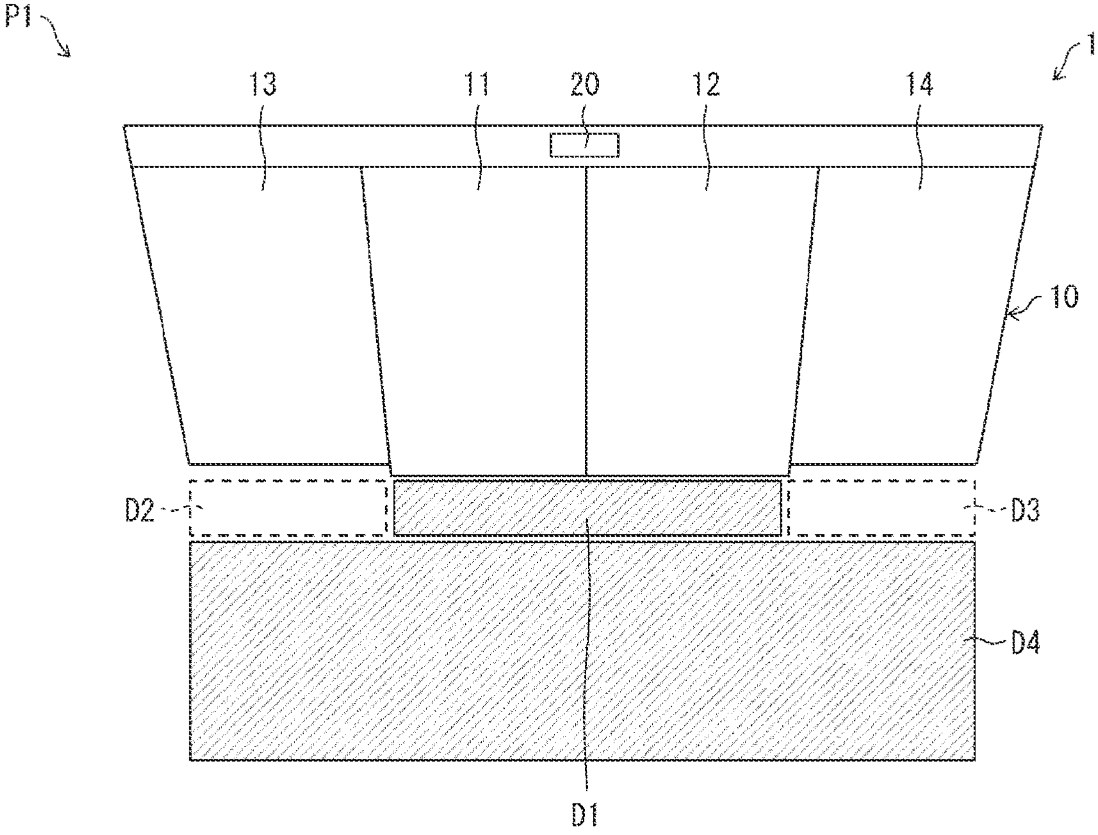
FIG. 3 is a view showing an example of a setting pattern of a detector.
Figure 3:
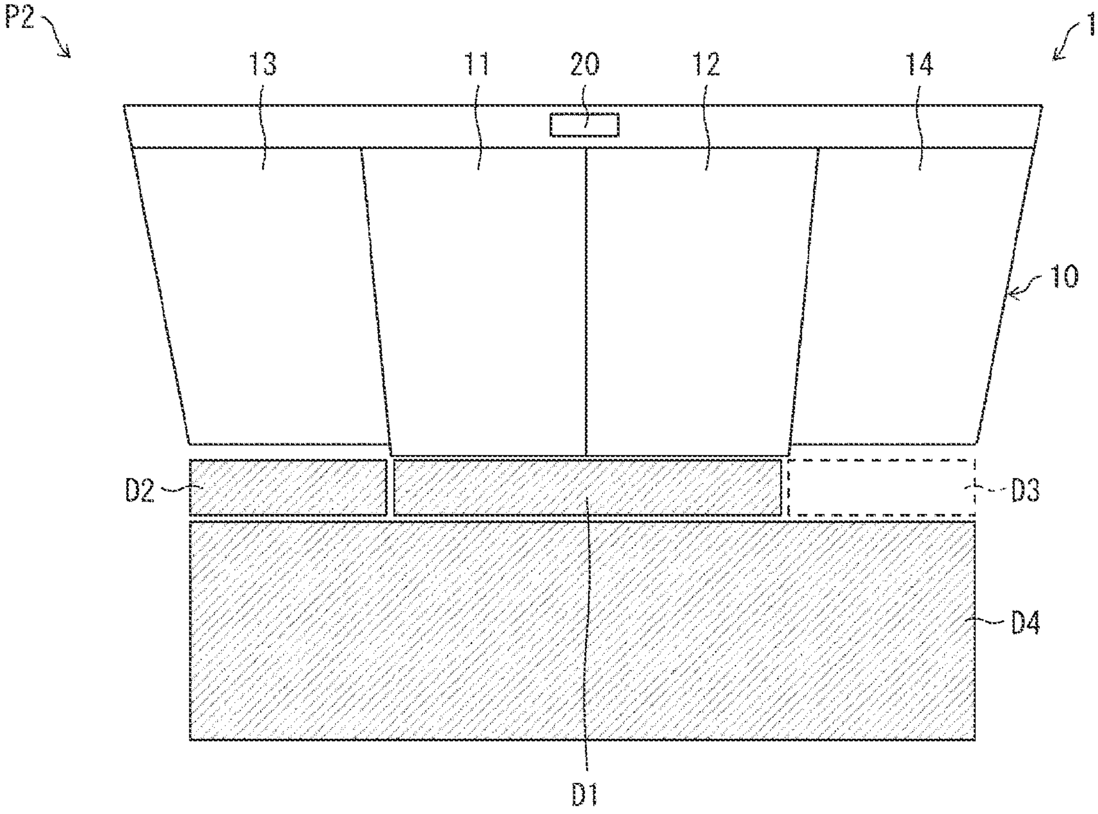

In an aspect of the present disclosure, the detector 20 may have one or more setting patterns for the detection region in advance. In the setting patterns, a plurality of detection regions may be set as the detection region. In this case, the detection region setting unit 26 may set the detection region by switching the setting pattern based on conditions such as time, day of the week, and external input. FIG. 3 is a view showing an example of a setting pattern of the detector 20. As shown in FIG. 3, the detector 20 may have, for example, a setting pattern P1 in which the region D1 and the region D4 are set as the detection region, and a setting pattern P2 in which the region D1, the region D2, and the region D4 are set as the detection region.

Figure 4:
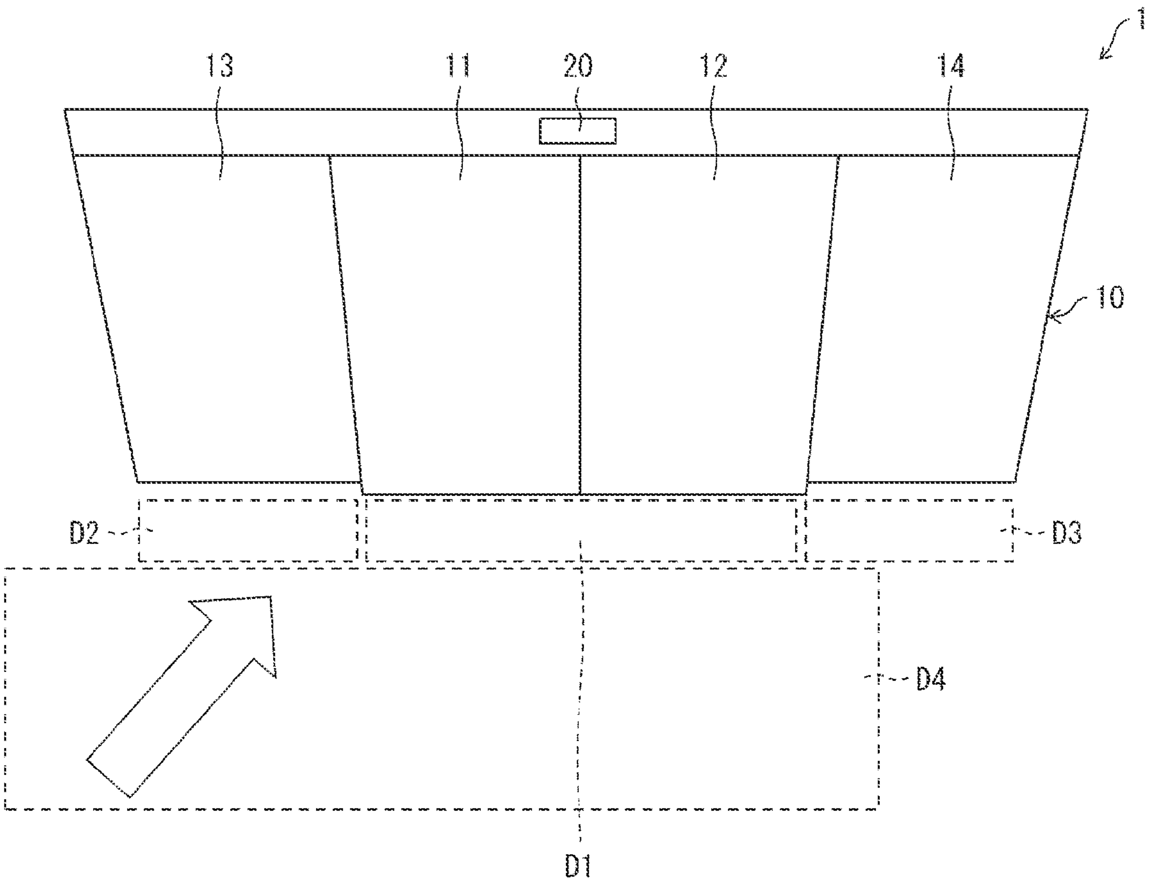
FIG. 4 is a view showing an example of a setting of a detection region by a detection region setting unit.

In an aspect of the present disclosure, the detection region setting unit 26 may set an asymmetric region with respect to the center of the detectable region of the detector 20 as the detection region. For example, the detection region setting unit 26 may set a detection region that is asymmetric with respect to the center of the detectable region of the detector 20 according to the number of people at the site where the automatic door 10 is provided, which is detected based on the position of the target calculated by the position determination unit 25. FIG. 4 is a view showing an example of a setting of a detection region by the detection region setting unit 26. As shown in FIG. 4, the detection region setting unit 26 may set the region D4 as the detection region so that the detection region of the region on a first sliding door 11 side becomes wider when there are more people on the first sliding door 11 side than on a second sliding door 12 side. Accordingly, since the detection accuracy in the region on the first sliding door 11 side can be improved, a safer automatic door system can be provided.

As described above, in the detector 20, the position of the target calculated by the position determination unit 25 in the detectable range in which the target can be detected is set as the detection region, and the detection unit 21 executes detection in the detection region. Therefore, it is not necessary to change the orientation of the detector according to a change in the position where the target is present, and it is not necessary to attach a member for changing the detection region. Further, the detector 20 can set the detection region without changing the detection sensitivity.

The control unit 30 controls operations of units of the automatic door system 1. The control unit 30 includes a region determination unit 31, a moving direction calculation unit 32, a number calculation unit 33, a passing target number output unit 34, and a door opening and closing control unit 35.

The region determination unit 31 determines a divided region where a target detected by the detector 20 is present, using information output from the detector 20, that is, a calculation result of the calculation unit 24 of the detector 20. More specifically, the region determination unit 31 determines a divided region where the target is present, using the distance from the detector 20 to the target and the angle of arrival of the reflected electromagnetic wave, which are calculated by the calculation unit 24. When the detection region of the detector 20 is divided into a plurality of divided regions which are the regions D1 to D4, the region determination unit 31 may determine a divided region in which the target is present among the regions D1 to D4.

The moving direction calculation unit 32 calculates the moving direction of the target detected by the detector 20. Specifically, the moving direction calculation unit 32 calculates the moving direction of the target based on the position of the target determined by the position determination unit 25 at a predetermined time interval.

The number calculation unit 33 calculates the number of targets detected by the detector 20. Specifically, the number calculation unit 33 calculates the number of symmetry based on the distance from the detector 20 to the target, the moving speed of the target, and the angle of arrival of the reflected electromagnetic wave, which are output from the calculation unit 24 of the detector 20. The number calculation unit 33 may calculate the number of targets simultaneously detected by the detector 20.

Based on the moving direction of the target calculated by the moving direction calculation unit 32, the passing target number output unit 34 determines whether the target is a target (hereinafter, referred to as a first target) entering through the automatic door 10 or a target (hereinafter, referred to as a second target) exiting from the automatic door 10. The passing target number output unit 34 calculates the number of the first targets described above and the number of the second targets described above, and outputs the numbers to an external device 100. Accordingly, the external device 100 can execute various types of management such as management of the number of users of the automatic door 10 using the number of the first targets described above and the number of the second targets described above that are output from the passing target number output unit 34.

The door opening and closing control unit 35 controls opening and closing of the first sliding door 11 and the second sliding door 12 based on the detection result of the detector 20 in the detection region set by the detection region setting unit 26.

In an aspect of the present disclosure, the door opening and closing control unit 35 may execute control according to each divided region in which the target determined by the region determination unit 31 is present based on the detection result of the detector 20. For example, when a target is present in a predetermined divided region, the door opening and closing control unit 35 may perform a different opening and closing operation of the first sliding door 11 and the second sliding door 12 from when the target is not present in the divided region. Specifically, when the target is present in the region D2 (or the region D3), the door opening and closing control unit 35 may decrease the opening speed of the first sliding door 11 (or the second sliding door 12) or stop the opening operation of the first sliding door 11 (or the second sliding door 12) as compared with when the target is not present in the region D2 (or the region D3).

In an aspect of the present disclosure, the door opening and closing control unit 35 may control opening and closing of the first sliding door 11 and the second sliding door 12 based on the moving speed of the target output from the calculation unit 24 of the detector 20 and the moving direction calculated by the moving direction calculation unit 32.

Figure 5:
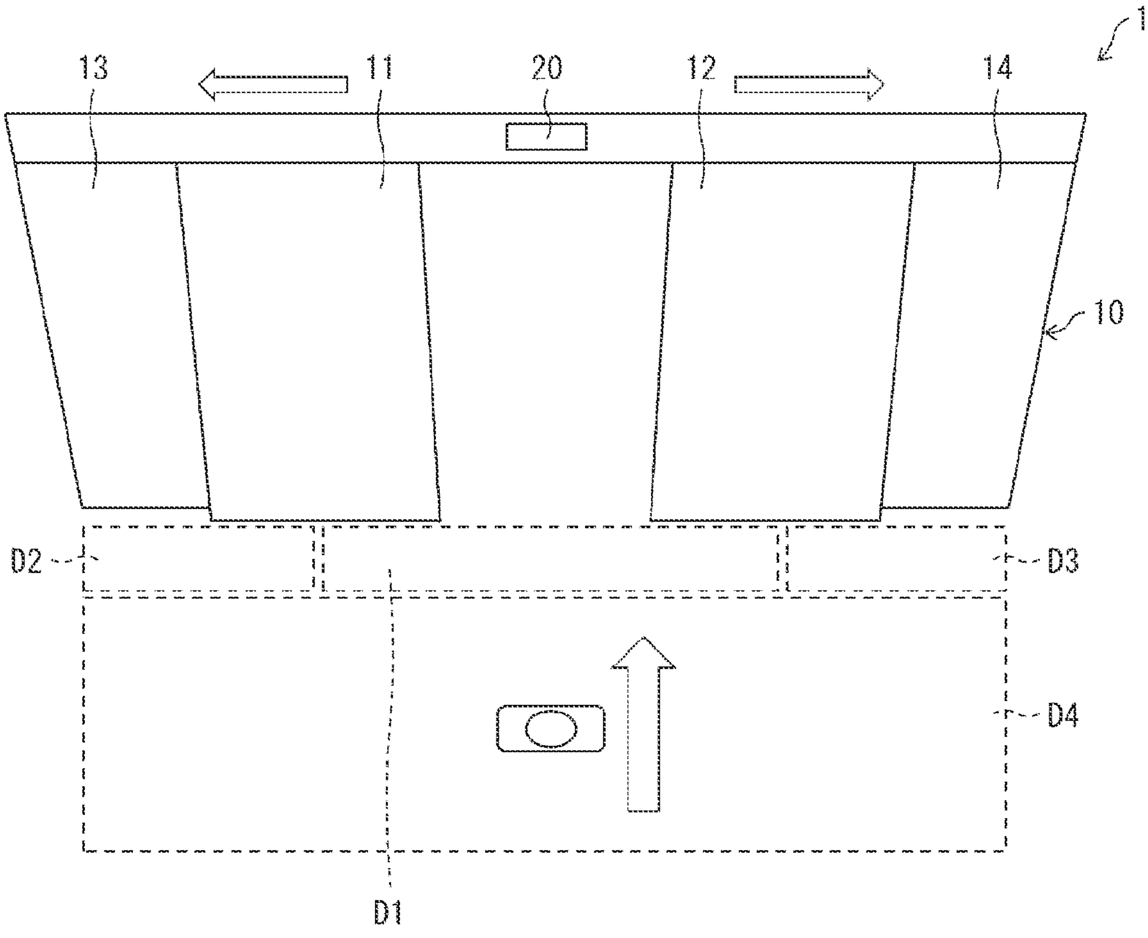
FIG. 5 is a view showing a state in which a door opening and closing control unit controls opening and closing of a first sliding door and a second sliding door based on a moving direction calculated by a moving direction calculation unit.
Figure 6:
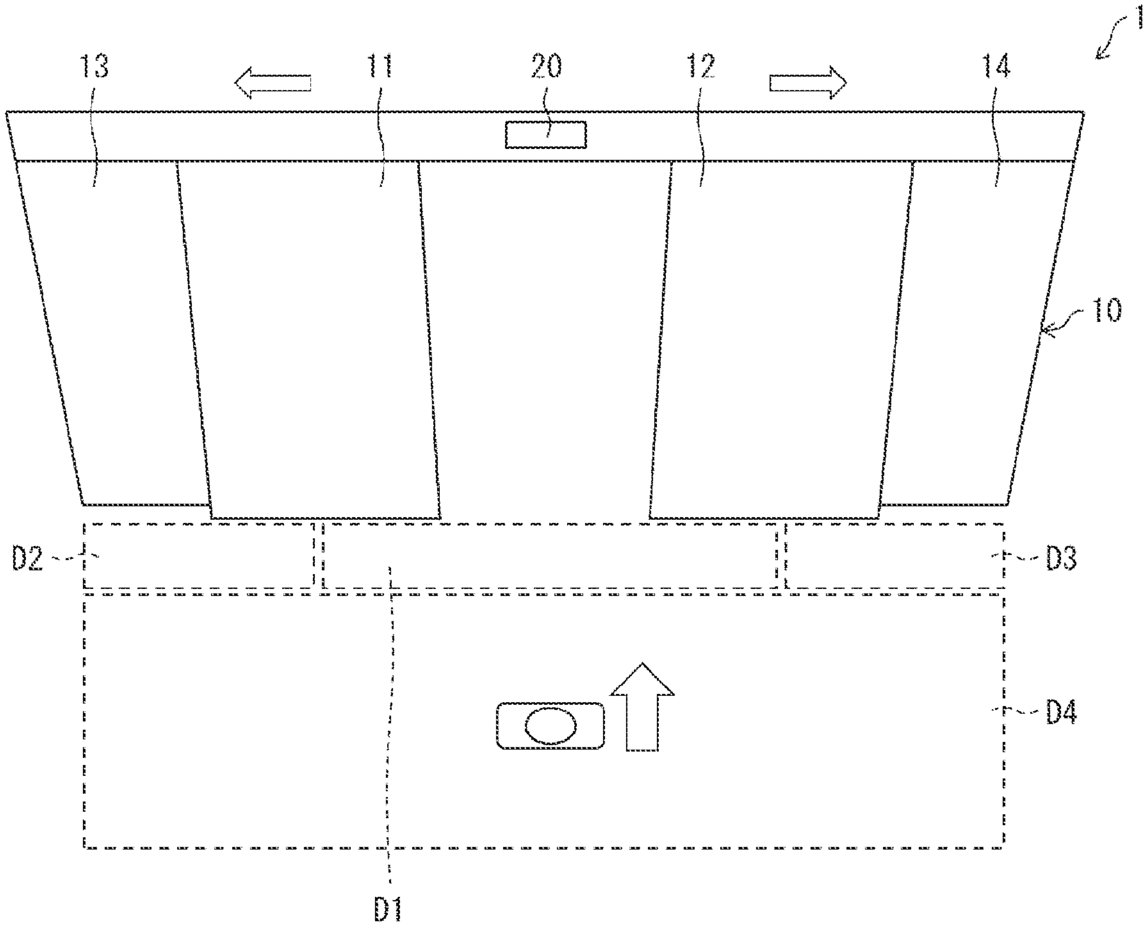
FIG. 6 is a view showing a state in which the door opening and closing control unit controls opening and closing of the first sliding door and the second sliding door based on the moving direction calculated by the moving direction calculation unit.

FIGS. 5 and 6 are views showing a state in which the door opening and closing control unit 35 controls opening and closing of the first sliding door 11 and the second sliding door 12 based on the moving direction calculated by the moving direction calculation unit 32. As shown in FIG. 5, the door opening and closing control unit 35 may control the first sliding door 11 and the second sliding door 12 such that the first sliding door 11 and the second sliding door 12 are opened at an opening speed higher than usual when the door opening and closing control unit 35 detects that the target is moving at a high speed toward the automatic door 10 based on the moving speed and the moving direction of the target. As shown in FIG. 6, the door opening and closing control unit 35 may control the first sliding door 11 and the second sliding door 12 such that the first sliding door 11 and the second sliding door 12 are opened at an opening speed lower than usual when the door opening and closing control unit 35 detects that the target is moving at a low speed toward the automatic door 10 based on the moving speed and the moving direction of the target.

In an aspect of the present disclosure, the door opening and closing control unit 35 may change opening and closing timings of the first sliding door 11 and the second sliding door 12 according to the moving speed of the target output from the calculation unit 24 of the detector 20 and the moving direction calculated by the moving direction calculation unit 32. For example, the first sliding door 11 and the second sliding door 12 may be controlled to be closed at a closing speed lower than usual when it is detected that the target passes through the automatic door 10 at a speed at which the target is slowly moved based on the moving speed and the moving direction of the target. In this aspect, the detector 20, the moving direction calculation unit 32, and the door opening and closing control unit 35 function as a door opening and closing control device that controls opening and closing of the first sliding door 11 and the second sliding door 12 using the moving direction of the target and the moving speed of the target.

Figure 7:
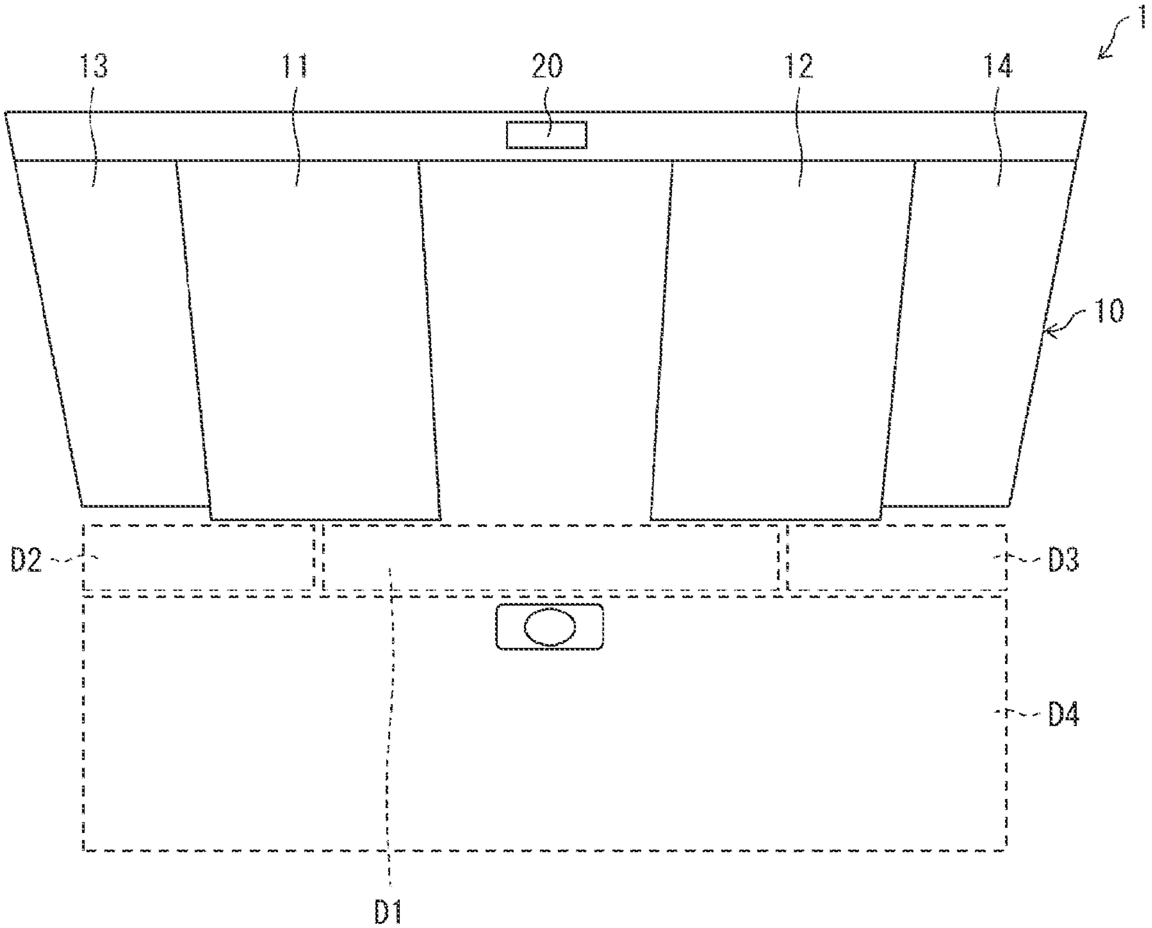
FIG. 7 is a view showing a state in which the door opening and closing control unit controls the opening and closing widths of the first sliding door and the second sliding door according to a position of a target calculated by a region determination unit.
Figure 8:
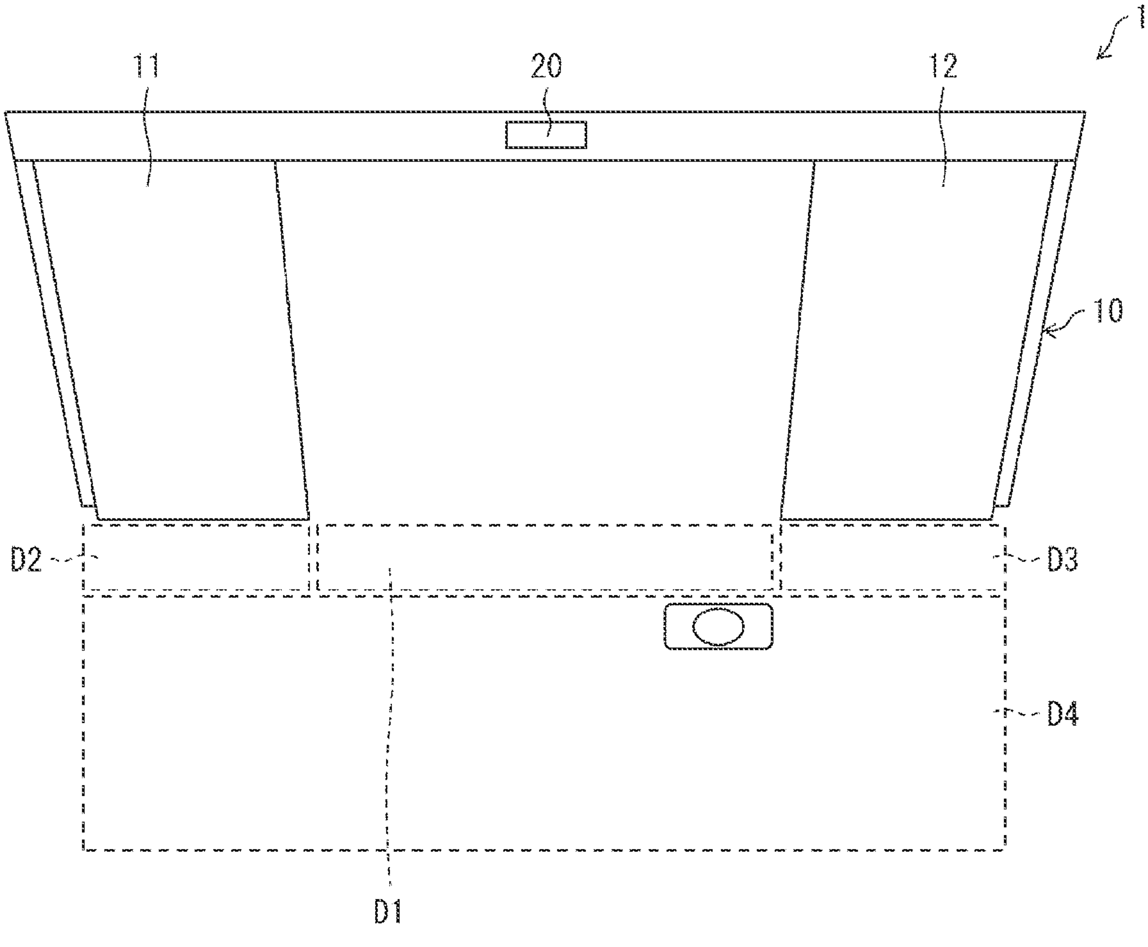
FIG. 8 is a view showing a state in which the door opening and closing control unit controls the opening and closing widths of the first sliding door and the second sliding door according to a position of a target calculated by the region determination unit.

In an aspect of the present disclosure, the door opening and closing control unit 35 may change the opening and closing widths of the first sliding door 11 and the second sliding door 12 according to the position of the target calculated by the region determination unit 31 based on the detection result of the detector 20. FIGS. 7 and 8 are views showing a state in which the door opening and closing control unit 35 controls the opening and closing widths of the first sliding door 11 and the second sliding door 12 according to the position of the target calculated by the region determination unit 31. As shown in FIG. 7, the door opening and closing control unit 35 may control the opening and closing width of the first sliding door 11 and the second sliding door 12 to be small when the target is located at the center of an opening and closing area of the automatic door 10. As shown in FIG. 8, the door opening and closing control unit 35 may control the opening and closing width of the first sliding door 11 and the second sliding door 12 to be wide when the target is located at the end of the opening and closing area of the automatic door 10.

Figure 9:
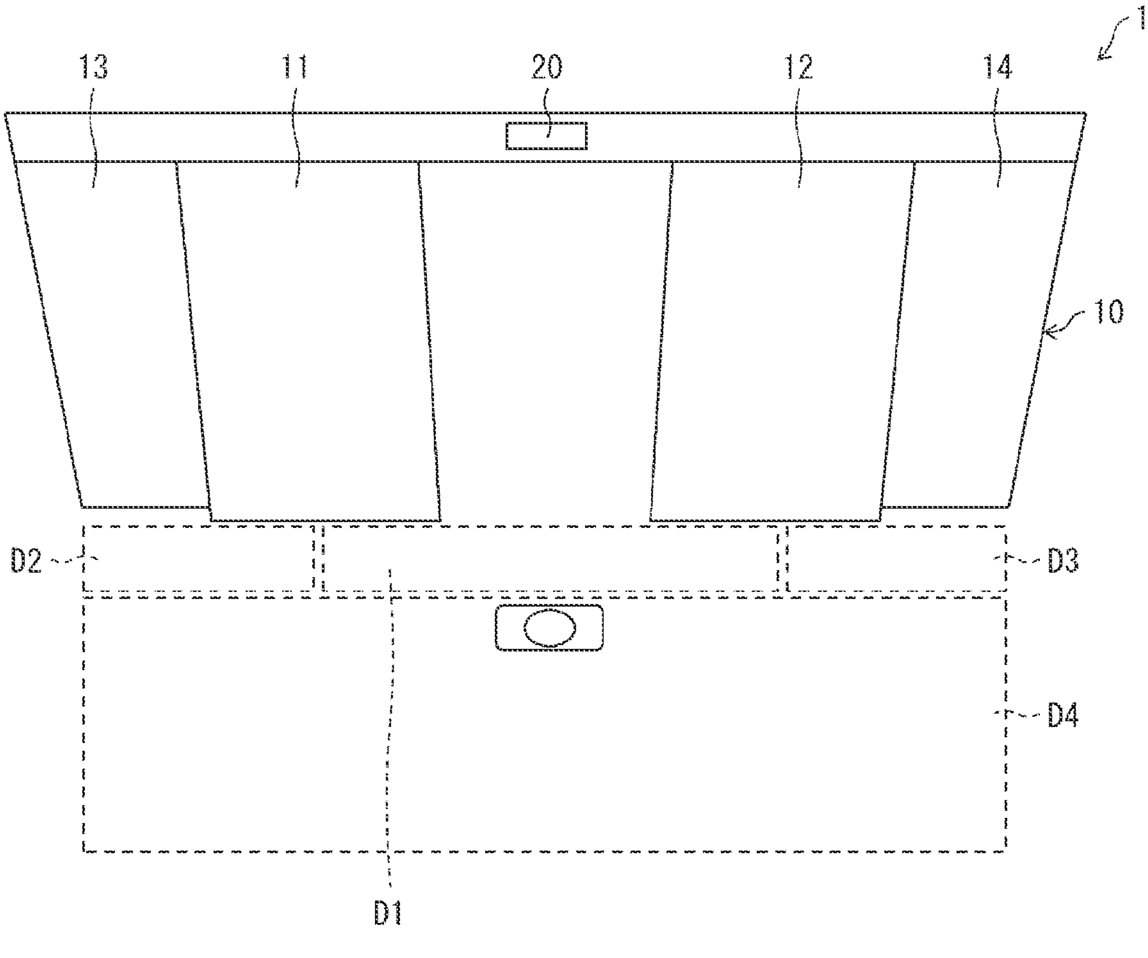
FIG. 9 is a view showing a state in which the door opening and closing control unit controls the opening and closing widths of the first sliding door and the second sliding door according to the number of targets calculated by a number calculation unit.
Figure 10:
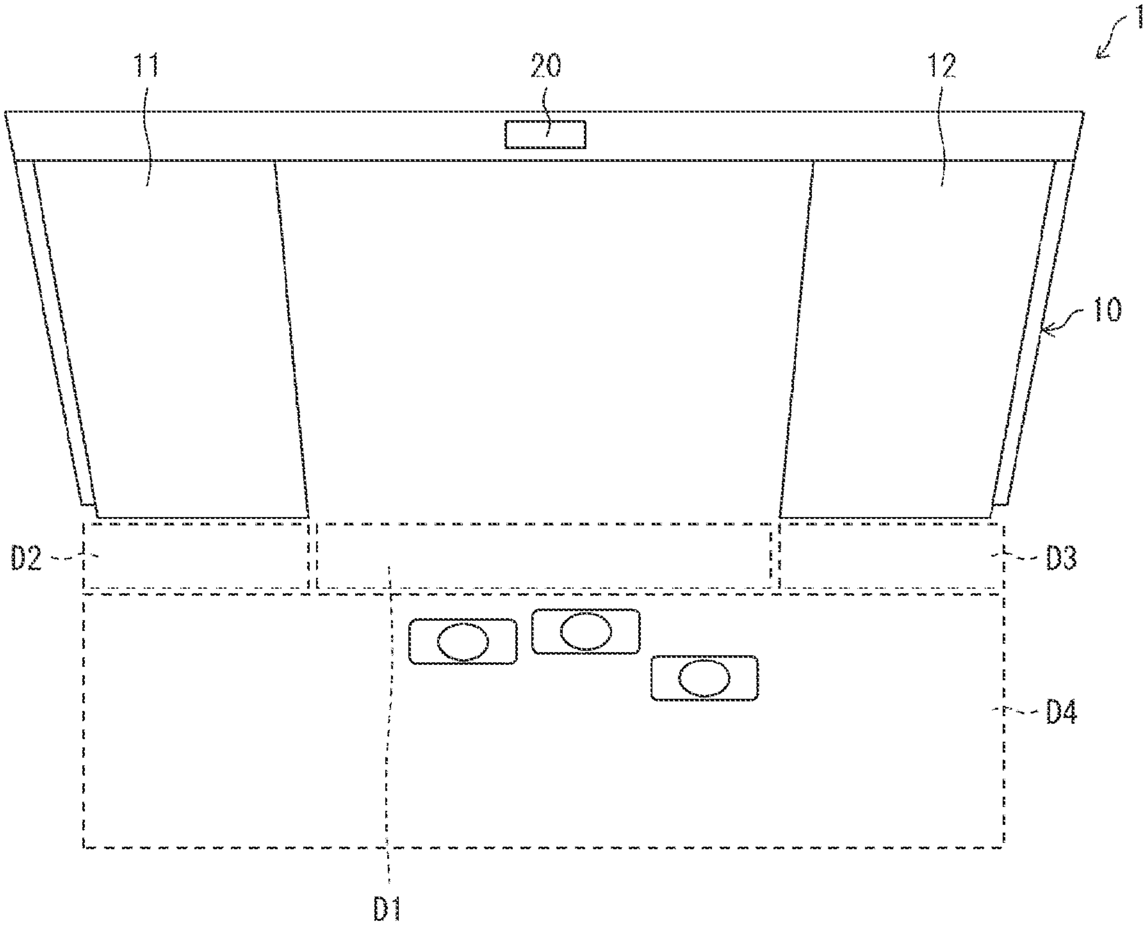
FIG. 10 is a view showing a state in which the door opening and closing control unit controls the opening and closing widths of the first sliding door and the second sliding door according to the number of targets calculated by the number calculation unit.

In an aspect of the present disclosure, the door opening and closing control unit 35 may change the opening and closing widths of the first sliding door 11 and the second sliding door 12 according to the number of targets calculated by the number calculation unit 33. FIGS. 9 and 10 are views showing a state in which the door opening and closing control unit 35 controls the opening and closing widths of the first sliding door 11 and the second sliding door 12 according to the number of targets calculated by the number calculation unit 33. As shown in FIG. 9, the door opening and closing control unit 35 may control the opening and closing widths of the first sliding door 11 and the second sliding door 12 to be small when the number of detected targets is small. As shown in FIG. 10, the door opening and closing control unit 35 may control the opening and closing widths of the first sliding door 11 and the second sliding door 12 to be large when the number of detected targets is large.

Figure 11:
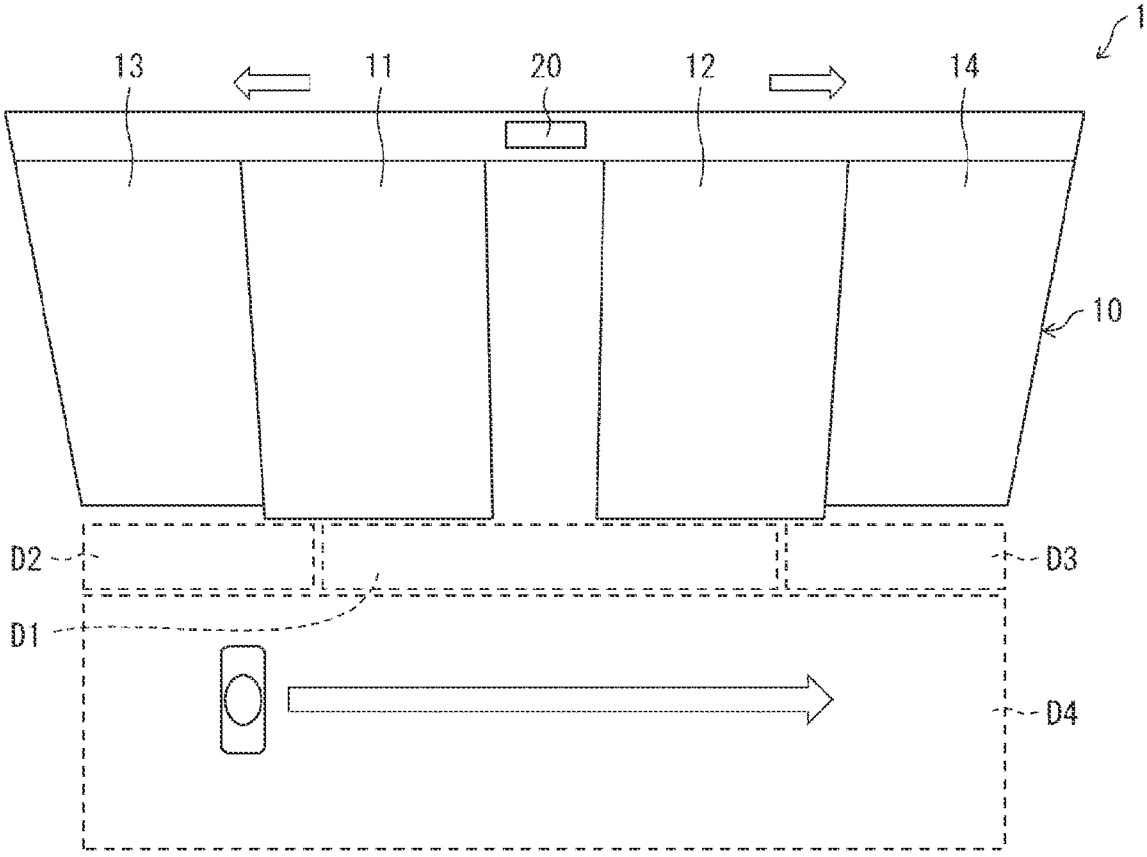
FIG. 11 is a view showing a state in which opening and closing of the first sliding door and the second sliding door are controlled when a moving direction of a target is a direction not approaching an automatic door after opening of the first sliding door and the second sliding door has been controlled.

In an aspect of the present disclosure, as shown in FIG. 11, when the moving direction of the target calculated by the moving direction calculation unit 32 is the moving direction not approaching the automatic door 10 after opening of the first sliding door 11 and the second sliding door 12 is controlled, the door opening and closing control unit 35 may stop the opening control of the first sliding door 11 and the second sliding door 12.

The alarm unit 40 issues an alarm to a target in the vicinity of the automatic door 10. The alarm unit 40 may issue an alarm by outputting sound, or may issue an alarm by emitting light. When the region determination unit 31 determines that the target is present in the region D2 or the region D3, the alarm unit 40 issues an alarm to the target in the vicinity of the automatic door 10. Accordingly, it is possible to notify a person in the region D2 or the region D3 that the first sliding door 11 or the second sliding door 12 is opened and there is a danger of colliding with the person. The alarm unit 40 is controlled by the control unit 30.

In the automatic door system 1 according to an aspect of the present disclosure, the detection region of the detector 20 includes, in addition to the region D1 through which a target passes for passing through the automatic door 10, the region D2 and the region D3 which are regions in the vicinity of two door pockets, that is, the first door pocket 13 and the second door pocket 14. Accordingly, one detector 20 can detect a target present in a region including a region in the vicinity of the two door pockets.

The door opening and closing control device according to an aspect of the present disclosure includes one detector 20, the moving direction calculation unit 32, and the door opening and closing control unit 35 that controls opening and closing of the first sliding door 11 and the second sliding door 12 using the moving direction of the target and the moving speed of the target. In the door opening and closing control device, opening and closing of the first sliding door 11 and the second sliding door 12 can be controlled according to the moving state of the target. In the door opening and closing control device, opening and closing of the first sliding door 11 and the second sliding door 12 can be controlled using one detector 20. Further, in the door opening and closing control device, since the detector 20 is a sensor using an electromagnetic wave, a driving such as a laser sensor is not necessary, and quietness and durability are excellent.

In the conventional technique, since a captured image is used, an individual to be detected is in an image. For this reason, an individual may be identified based on this image, which may become a problem with an increase in protection and regulation for privacy in recent years.

On the other hand, a door opening and closing control device according to an aspect of the present disclosure calculates the distance to a target, the moving speed of the target, and the angle of the target using a transmitted electromagnetic wave and a reflected electromagnetic wave, and executes detection. Accordingly, the detection is not executed using a captured image that can be visually recognized by a person, and an individual is not identified.

Further, the door opening and closing control device according to an aspect of the present disclosure does not use a configuration in which detection is executed by outputting an electric signal according to the intensity of light, such as a charge coupled device (CCD) in the conventional technique. Accordingly, when an electromagnetic wave other than the wavelength contained in the sunlight reached on the ground is used, the moving state of the target can be reliably detected even when there is strong light in which the sunlight is directly hit or even when the surrounding situation is dark. An electromagnetic wave other than the visible light may be used instead of an electromagnetic wave other than the wavelength contained in the sunlight reached on the ground.

Embodiment 2

Another embodiment of the present disclosure will be described below. For convenience of description, members having the same functions as those described in the above embodiment are denoted by the same reference signs, and the description thereof will not be repeated.

In the embodiment 1, an aspect has been described in which the detector 20 is applied to the automatic door system. In the present embodiment, an aspect will be described in which the detector 20 is applied to a shutter opening and closing system.

Figure 12:
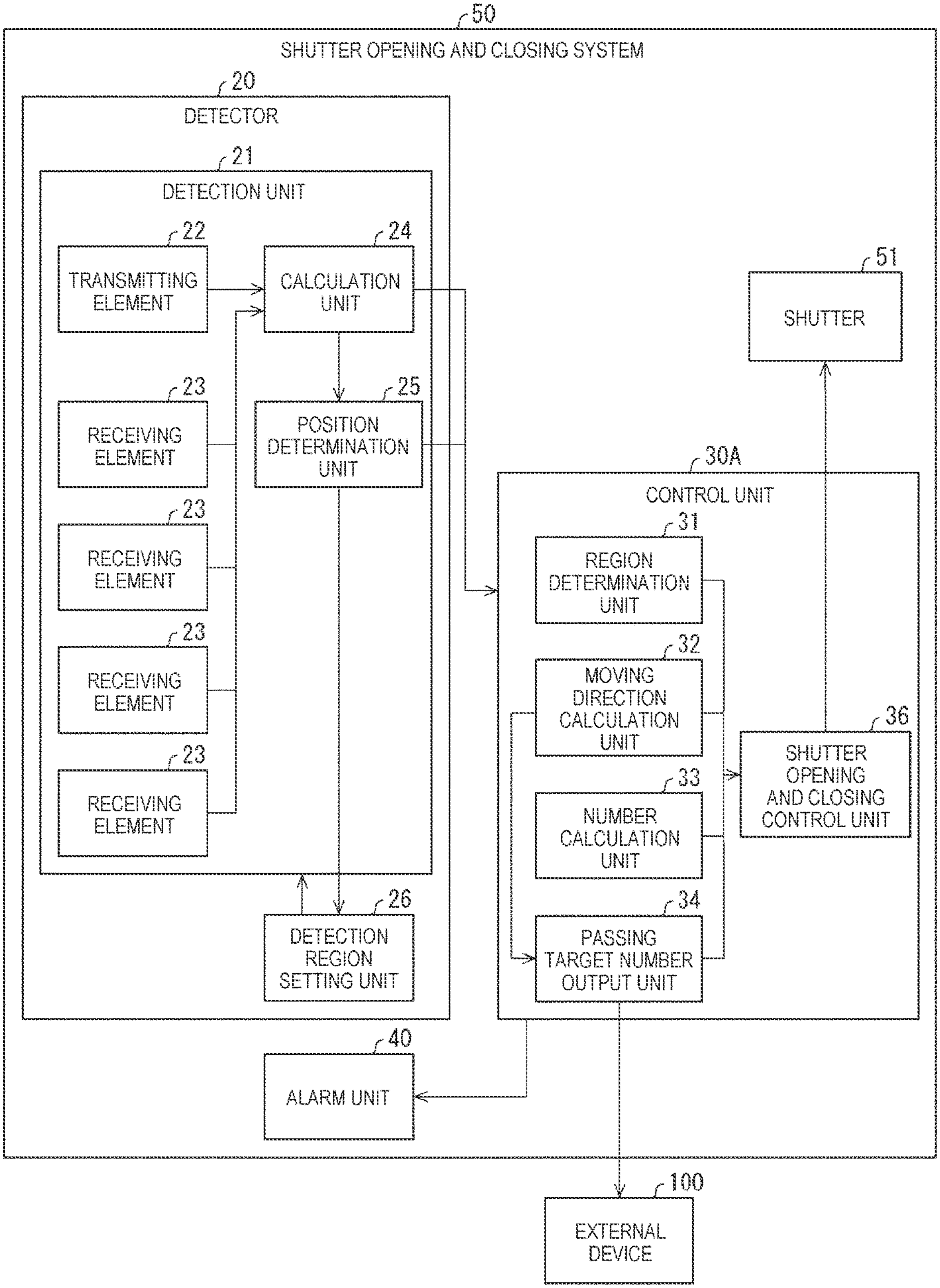
FIG. 12 is a block diagram showing a main configuration of a shutter opening and closing system according to an embodiment 2 of the present disclosure.
Figure 13:
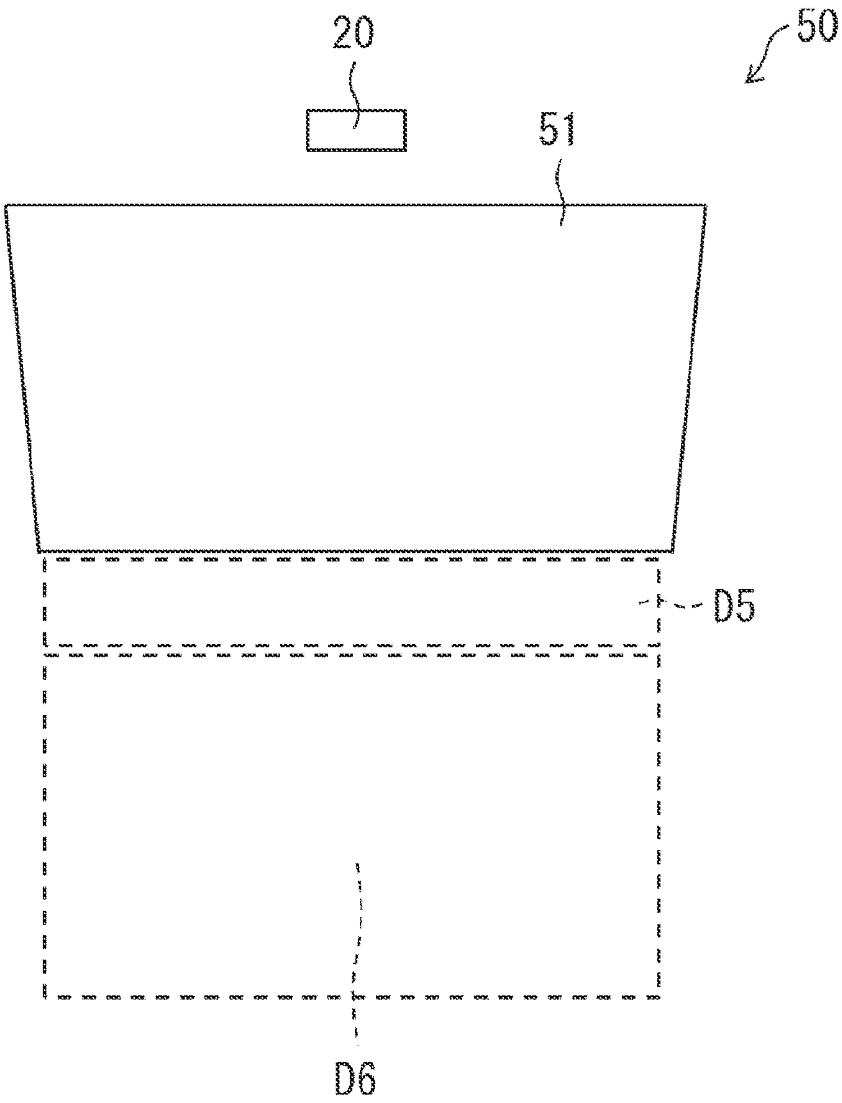
FIG. 13 is an external view of the shutter opening and closing system described above.

FIG. 12 is a block diagram showing a main configuration of a shutter opening and closing system 50 (an opening and closing system) according to the present embodiment. FIG. 13 is an external view of the shutter opening and closing system 50. As shown in FIGS. 12 and 13, the shutter opening and closing system 50 includes a shutter 51, the detector 20, and a control unit 30A.

The shutter 51 can be opened and closed in the upper-lower direction. The shutter 51 is switched from the closed state to the open state by moving the shutter 51 upward.

As shown in FIG. 13, the detector 20 according to the present embodiment can set, as a detectable region, a region including a region D5, which is a region in the vicinity of the shutter 51, and a region D6, which is a region outside the region D5 by a predetermined distance in the depth direction.

The control unit 30A includes a shutter opening and closing control unit 36 instead of the door opening and closing control unit 35 of the control unit 30 in the embodiment 1.

The shutter opening and closing control unit 36 controls opening and closing of the shutter 51 based on a detection result of the detector 20.

Figure 14:
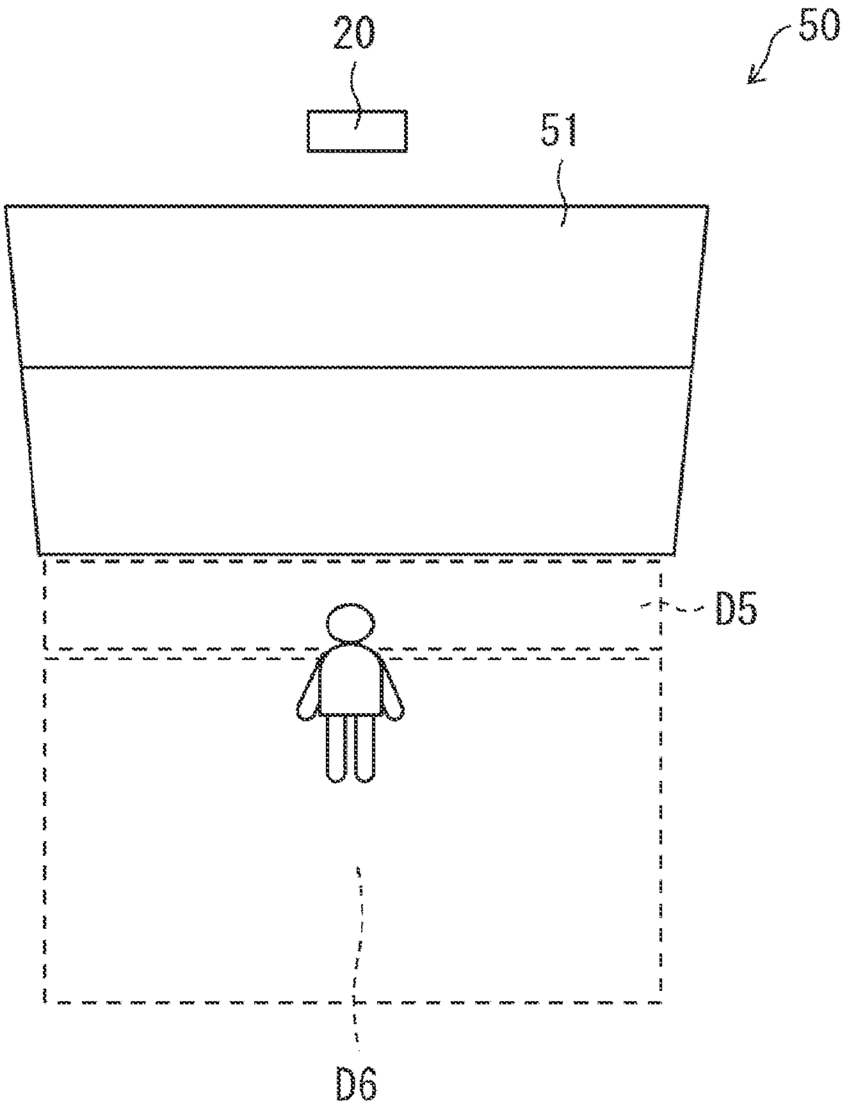
FIG. 14 is a view showing a state in which the shutter opening and closing control unit controls the opening and closing width of a shutter according to the height of a target determined by a position determination unit.
Figure 15:
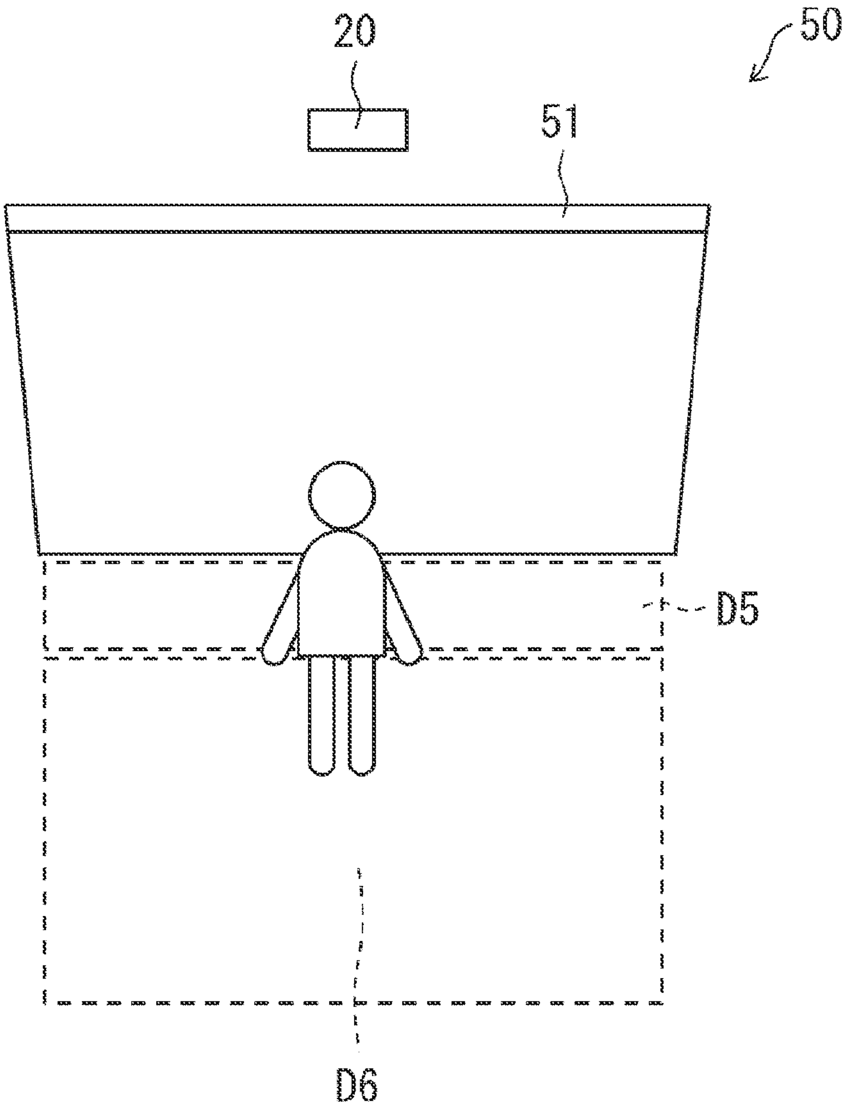
FIG. 15 is a view showing a state in which the shutter opening and closing control unit controls the opening and closing width of a shutter according to the height of a target determined by the position determination unit.

In an aspect of the present disclosure, the shutter opening and closing control unit 36 may change the opening and closing width of the shutter 51 according to the height of the target determined by the position determination unit 25. FIGS. 14 and 15 are views showing a state in which the shutter opening and closing control unit 36 controls the opening and closing width of the shutter 51 according to the height of the target determined by the position determination unit 25. The shutter opening and closing control unit 36 may control the opening and closing width of the shutter 51 to be small when the height of the target is small as shown in FIG. 12, and may control the opening and closing width of the shutter 51 to be large when the height of the target is large as shown in FIG. 15.

In an aspect of the present disclosure, the shutter opening and closing control unit 36 may control opening and closing of the shutter 51 based on the moving speed of the target output from the calculation unit 24 of the detector 20 and the moving direction calculated by the moving direction calculation unit 32. For example, the shutter opening and closing control unit 36 may control the shutter 51 to open at an opening speed higher than usual when the shutter opening and closing control unit 36 detects that the target is moving at a high speed toward the shutter 51 based on the moving speed and the moving direction of the target.

In an aspect of the present disclosure, the shutter opening and closing control unit 36 may change the opening and closing timing of the shutter 51 according to the moving speed of the target output from the calculation unit 24 of the detector 20 and the moving direction calculated by the moving direction calculation unit 32. For example, the shutter 51 may be controlled to be closed at a closing speed lower than usual when it is detected that the target passes through the shutter 51 at a speed at which the target is slowly moved based on the moving speed and the moving direction of the target.

In an aspect of the present disclosure, the shutter opening and closing control unit 36 may stop the opening control of the shutter 51 when the moving direction of the target calculated by the moving direction calculation unit 32 is a direction not approaching the shutter 51 after opening of the shutter 51 has been controlled.

As described above, the shutter opening and closing system 50 according to the present embodiment includes the detector 20 that can set the position of the target calculated by the position determination unit 25 as the detection region in the detectable range in which the target can be detected, and the shutter 51 that is opened and closed based on the detection result of the detector 20. Accordingly, the position of the target calculated by the position determination unit 25 can be set as the detection region in the detectable range in which the target can be detected. Therefore, it is not necessary to change the orientation of the detector according to a change in the position where the target is present, and it is not necessary to attach a member for changing the detection region.

Embodiment 3

Another embodiment of the present disclosure will be described below. For convenience of description, members having the same functions as those described in the above embodiment are denoted by the same reference signs, and the description thereof will not be repeated.

Figure 16:
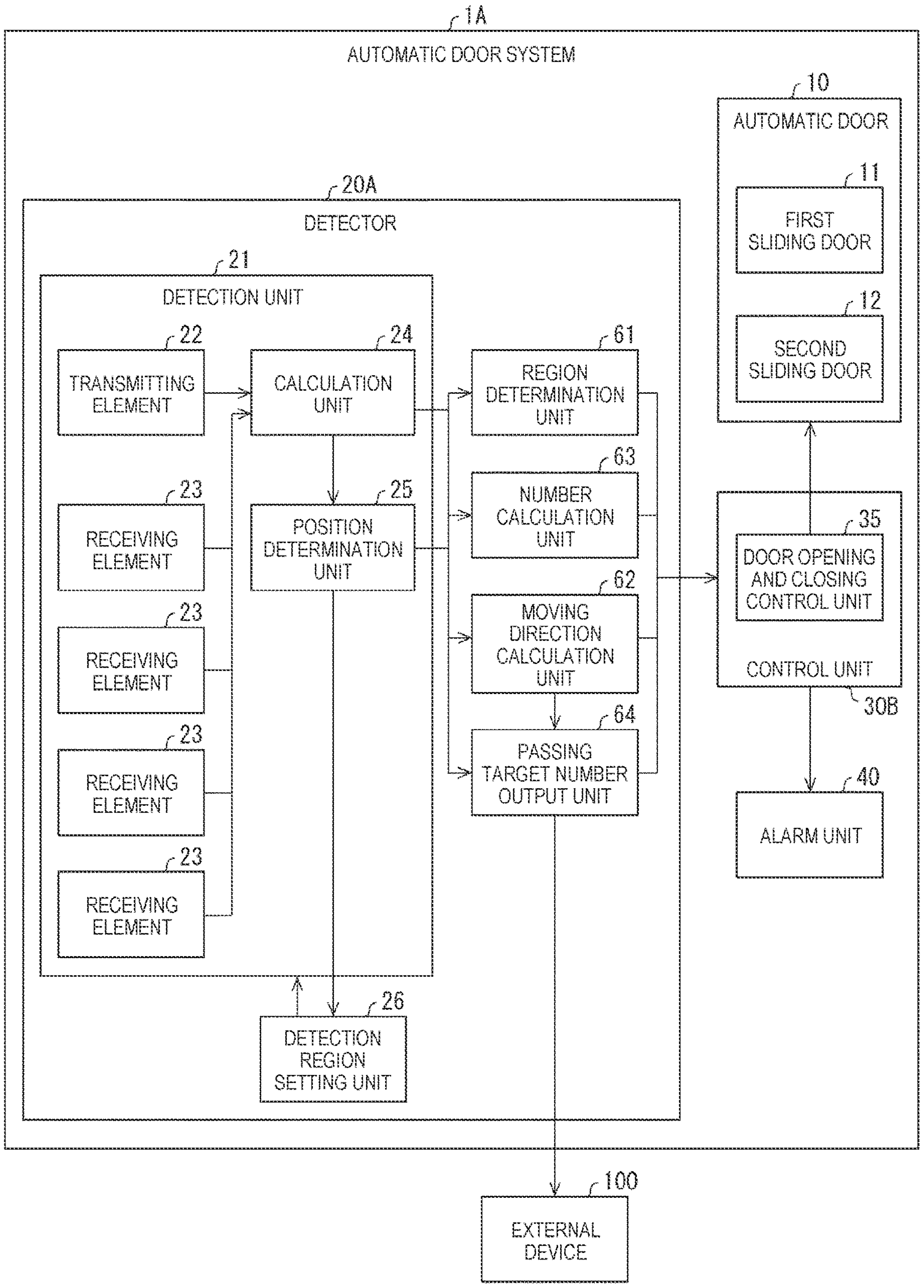
FIG. 16 is a block diagram showing a main configuration of an automatic door system according to an embodiment 3 of the present disclosure.

FIG. 16 is a block diagram showing a main configuration of an automatic door system 1A according to the present embodiment. As shown in FIG. 16, the automatic door system 1A includes a detector 20A and a control unit 30B instead of the detector 20 and the control unit 30 in the embodiment 1.

In the automatic door system 1 according to the embodiment 1, the control unit 30 includes the region determination unit 31, the moving direction calculation unit 32, the number calculation unit 33, and the passing target number output unit 34. On the other hand, in the automatic door system 1A, the detector 20A includes a region determination unit 61, a moving direction calculation unit 62, a number calculation unit 63, and a passing target number output unit 64. The functions of the region determination unit 61, the moving direction calculation unit 62, the number calculation unit 63, and the passing target number output unit 64 are the same as the functions of the region determination unit 31, the moving direction calculation unit 32, the number calculation unit 33, and the passing target number output unit 34 in the embodiment 1. Therefore, in the automatic door system 1A according to the present embodiment, the same effects as those of the automatic door system 1 according to the embodiment 1 are also attained.

In the embodiments 1 to 3 described above, aspects have been described in which the detector 20 is applied to the automatic door system or the shutter opening and closing system. The detector 20 can be applied to other door opening and closing systems such as a gate opening and closing system that controls opening and closing of a gate.

The present disclosure is not limited to the embodiments described above, and various modifications can be made within the scope of the claims. Embodiments obtained by appropriately combining technical methods disclosed in different embodiments are also included in the technical scope of the present disclosure.

SUMMARY

The present invention can also be described as follows. An automatic door system according to an aspect of the present disclosure is an automatic door system including a double sliding door. The automatic door system includes: one sensor configured to detect a target; and a door opening and closing control unit configured to control opening and closing of the door based on a detection result of the sensor. The sensor includes one or more transmitting elements configured to transmit a frequency modulated continuous wave (FMCW) type transmitted electromagnetic wave, and two or more receiving elements configured to receive a reflected electromagnetic wave obtained by the transmitted electromagnetic wave being reflected by the target. A detection region of the sensor includes, in addition to a region through which the target passes for passing through the door, a region in a vicinity of two door pockets of the door.

According to the above configuration, since the detection range of the sensor is wide, it is possible to detect the target present in the region including the region in the vicinity of the two door pockets of the double sliding door with one sensor.

The automatic door system according to an aspect of the present disclosure may further include: a calculation unit configured to calculate a distance to the target and an angle of the target with respect to the sensor using the transmitted electromagnetic wave and the reflected electromagnetic wave; and a region determination unit configured to determine, using a calculation result of the calculation unit, a divided region in which the target detected by the sensor is present. The door opening and closing control unit may execute control according to each of the divided regions in which the target is present.

According to the above configuration, since it is possible to execute control according to each of the divided regions, it is possible to execute control according to various scenes.

In the automatic door system according to an aspect of the present invention, when the target is present in the divided region, the door opening and closing control unit may perform an opening and closing operation different from when the target is not present in the divided region.

According to the above configuration, it is possible to perform an appropriate opening and closing operation according to a case in which the target is present in the predetermined divided region and a case in which a target is not present in the predetermined divided region.

In the automatic door system according to an aspect of the present invention, an opening operation performed when the target is present in the divided region by the door opening and closing control unit may be to decrease an opening speed of the door or stop an opening operation as compared with when the target is not present in the divided region.

According to the above configuration, for example, it is possible to execute safe control on the target by decreasing the opening speed of the door or stopping the opening operation when the target is present in the vicinity of the door pocket.

The automatic door system according to an aspect of the present invention may further include an alarm unit configured to output sound or emit light when the target is present in the divided region.

According to the above configuration, a warning can be issued to the target present in the divided region.

REFERENCE SIGNS LIST

1, 1A automatic door system
10 automatic door
11 first sliding door (double sliding door, door)
12 second sliding door (double sliding door, door)
13 first door pocket
14 second door pocket
20, 20A detector (sensor)
21 detection unit
22 transmitting element
23 receiving element
24 calculation unit
25 position determination unit
26 detection region setting unit
30, 30A, 30B control unit
31, 61 region determination unit
32, 62 moving direction calculation unit
33, 63 number calculation unit
34, 64 passing target number output unit
35 door opening and closing control unit
36 shutter opening and closing control unit (door opening and closing control unit)
40 alarm unit
50 shutter opening and closing system (opening and closing system)
51 shutter (door)

The invention claimed is:

1. An automatic door system including a double sliding door, the double sliding door including a first sliding door and a second sliding door, the automatic door system comprising:

one sensor configured to detect a target;

a door opening and closing control unit configured to control opening and closing of the first sliding door and the second sliding door based on a detection result of the sensor; and a first door pocket in which the first sliding door is located when the first sliding door is in an open state, and a second door pocket in which the second sliding door is located when the second sliding door is in the open state, wherein the sensor includes one or more transmitting elements configured to transmit a frequency modulated continuous wave (FMCW) type transmitted electromagnetic wave, and two or more receiving elements configured to receive a reflected electromagnetic wave obtained by the transmitted electromagnetic wave being reflected by the target, wherein a detection region of the sensor includes a region through which the target passes for passing the first sliding door and the second sliding door, a region in a first vicinity of the first door pocket, and a region in a second vicinity of the second door pocket, wherein the first vicinity is a region whose range in a sliding direction is a range in which the first door pocket is located, and whose range in a depth direction extends from the first sliding door to a predetermined distance, and wherein the second vicinity is a region whose range in the sliding direction is a range in which the second door pocket is located, and whose range in the depth direction extends from the second sliding door to the predetermined distance.

2. The automatic door system according to claim 1, further comprising:

a calculation unit configured to calculate a distance to the target and an angle of the target with respect to the sensor using the transmitted electromagnetic wave and the reflected electromagnetic wave; and a region determination unit configured to determine, using a calculation result of the calculation unit, a divided region in which the target detected by the sensor is present, wherein the door opening and closing control unit executes control according to each of the divided regions in which the target is present.

3. The automatic door system according to claim 2, wherein, when the target is present in the divided region, the door opening and closing control unit performs an opening and closing operation different from when the target is not present in the divided region.

4. The automatic door system according to claim 3, wherein an opening operation performed when the target is present in the divided region by the door opening and closing control unit is to decrease an opening speed of the double sliding door or stop an opening operation as compared with when the target is not present in the divided region.

5. The automatic door system according to claim 3, further comprising an alarm unit configured to output sound or emit light when the target is present in the divided region.

* * * * *